US012010272B2

(12) United States Patent
Bouvet

(10) Patent No.: US 12,010,272 B2
(45) Date of Patent: Jun. 11, 2024

(54) METHOD FOR PROCESSING VOICE MESSAGES, METHOD FOR DEACTIVATING DTMF CODING AND METHOD FOR PROCESSING A REQUEST TO DEACTIVATE DTMF CODING

(71) Applicant: Orange, Issy-les-Moulineaux (FR)

(72) Inventor: Bertrand Bouvet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 361 days.

(21) Appl. No.: 17/418,620

(22) PCT Filed: Dec. 9, 2019

(86) PCT No.: PCT/FR2019/052964
§ 371 (c)(1),
(2) Date: Jun. 25, 2021

(87) PCT Pub. No.: WO2020/136315
PCT Pub. Date: Jul. 2, 2020

(65) Prior Publication Data
US 2022/0086284 A1  Mar. 17, 2022

(30) Foreign Application Priority Data
Dec. 28, 2018  (FR) ...................................... 1874344

(51) Int. Cl.
*H04M 7/12* (2006.01)
*H04L 65/1069* (2022.01)
(Continued)

(52) U.S. Cl.
CPC ...... *H04M 7/1295* (2013.01); *H04L 65/1069* (2013.01); *H04L 65/1104* (2022.05); *H04M 3/533* (2013.01); *H04M 7/0069* (2013.01)

(58) Field of Classification Search
CPC .. H04M 7/1295; H04M 3/533; H04M 7/0069; H04L 65/1069; H04L 65/1104
See application file for complete search history.

(56) References Cited

U.S. PATENT DOCUMENTS 5,459,781 A * 10/1995 Kaplan ................... H04M 1/82
                                                                379/283
6,229,880 B1 * 5/2001 Reformato .............. H04M 1/64
                                                                379/207.02
(Continued)

FOREIGN PATENT DOCUMENTS

WO   WO 2017/197650 A1   11/2017
WO   WO-2020136315 A1 *  7/2020   ......... H04L 65/1006

OTHER PUBLICATIONS

International Search Report and Written Opinion dated Mar. 17, 2020 for Application No. PCT/FR2019/052964.

*Primary Examiner* — Akelaw Teshale
(74) *Attorney, Agent, or Firm* — Knobbe, Martens, Olson & Bear, LLP

(57) ABSTRACT

Methods are described for processing voice messages, for deactivating DTMF coding, and for processing a request to deactivate DTMF coding. The method for processing voice messages using a terminal includes sending a request to a voice server to be interpreted by the server to deactivate DTMF coding on a communication channel between the server and the terminal, receiving, from the server, a datum relating to the terminal's configuration, interpreting the configuration datum and applying to the terminal a configuration mode obtained from the interpretation, and processing voice messages using the terminal according to the configuration mode.

19 Claims, 5 Drawing Sheets

(51) Int. Cl.
*H04L 65/1104* (2022.01)
*H04M 3/533* (2006.01)
*H04M 7/00* (2006.01)

(56) References Cited

U.S. PATENT DOCUMENTS

| | | | |
|---|---|---|---|
| 6,529,587 B1* | 3/2003 | Cannon | H04M 3/533 379/388.04 |
| 6,775,265 B1* | 8/2004 | Oran | H04M 7/1295 370/352 |
| 7,233,605 B1* | 6/2007 | Oran | H04L 65/765 370/526 |
| 8,670,972 B1* | 3/2014 | Varman | G06F 11/3664 703/24 |
| 8,838,074 B2* | 9/2014 | Kurganov | G10L 21/00 455/461 |
| 10,965,800 B2* | 3/2021 | Li | H04M 1/72412 |
| 2002/0006137 A1* | 1/2002 | Rabenko | H04L 12/4604 370/352 |
| 2002/0168055 A1* | 11/2002 | Crockett | H04M 3/38 704/275 |
| 2004/0230434 A1* | 11/2004 | Galanes | H04M 3/4938 704/270.1 |
| 2005/0036591 A1* | 2/2005 | Jursinski | H04M 1/642 379/88.16 |
| 2007/0206747 A1* | 9/2007 | Gruchala | H04M 3/436 379/142.01 |
| 2010/0162122 A1* | 6/2010 | Mikan | H04M 3/53383 711/100 |
| 2015/0057051 A1* | 2/2015 | Gupta | H04M 1/6041 455/569.1 |
| 2016/0088142 A1* | 3/2016 | Gupta | G10L 17/24 455/412.1 |
| 2019/0222684 A1* | 7/2019 | Li | H04M 1/72475 |

\* cited by examiner

[Fig. 1]
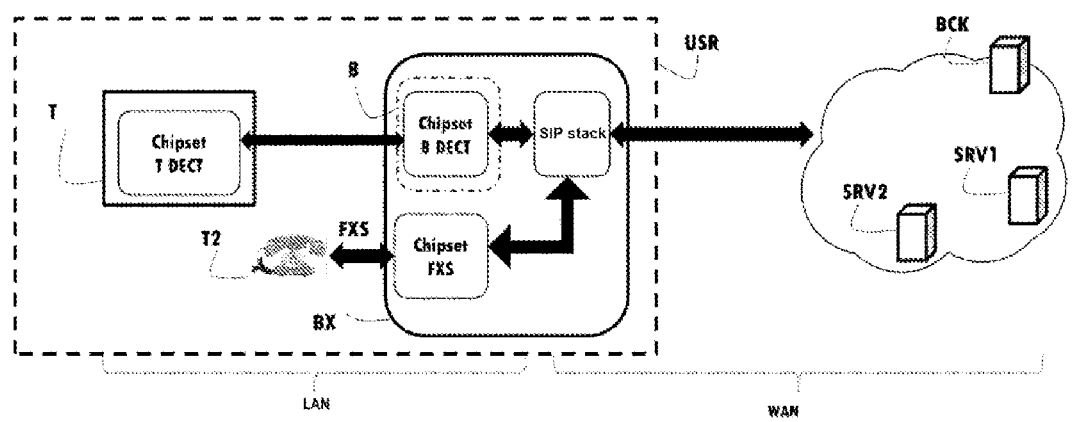
[Fig. 2]
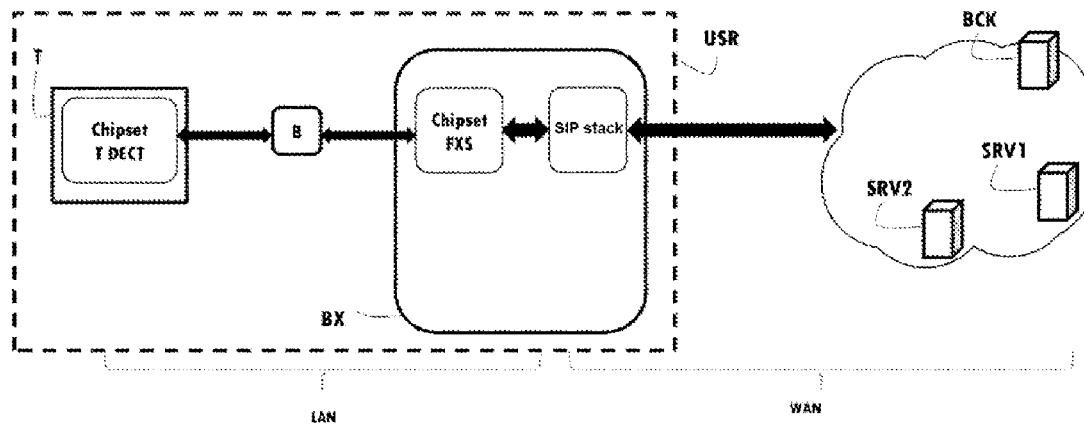

[Fig. 3]
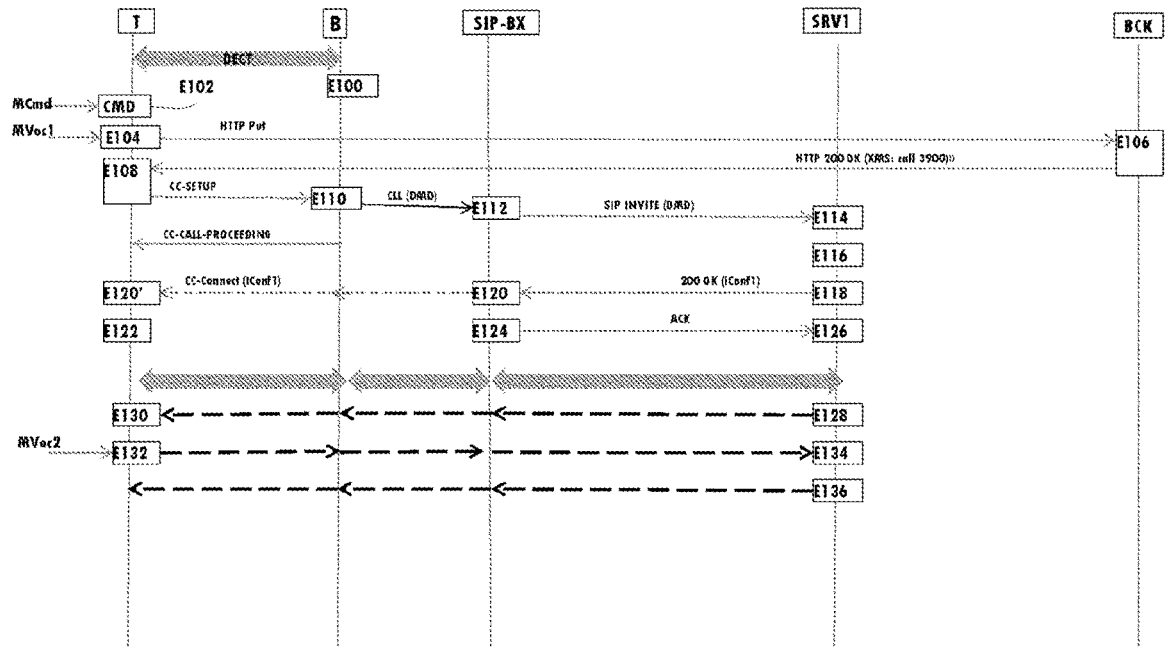
[Fig. 4]
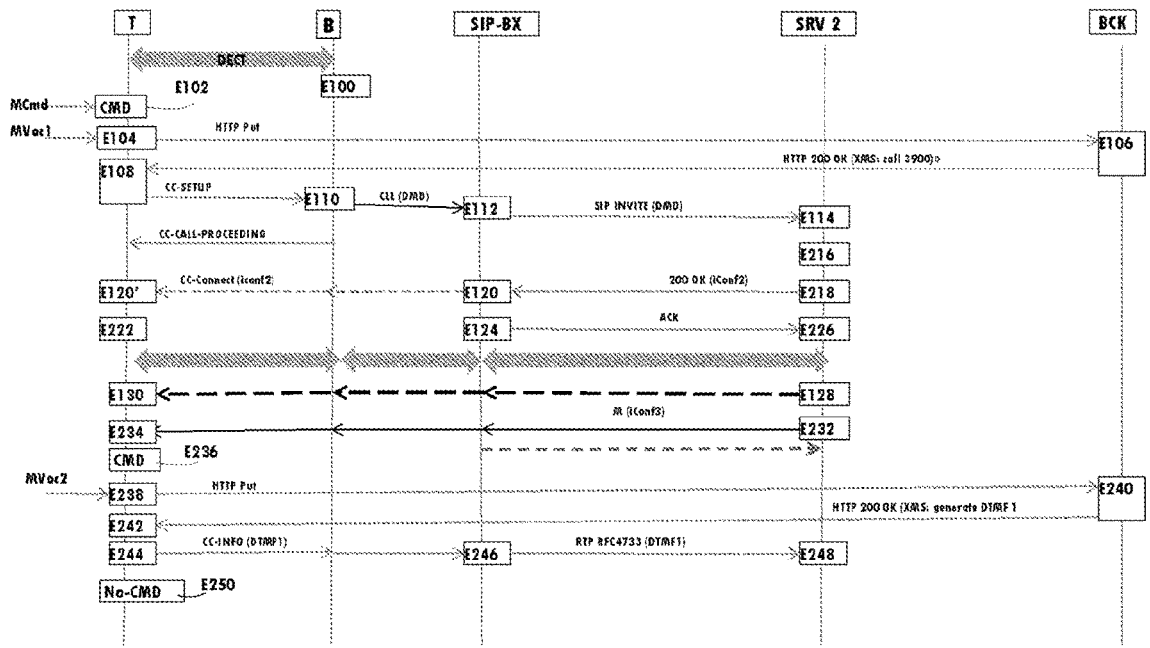

[Fig. 5]
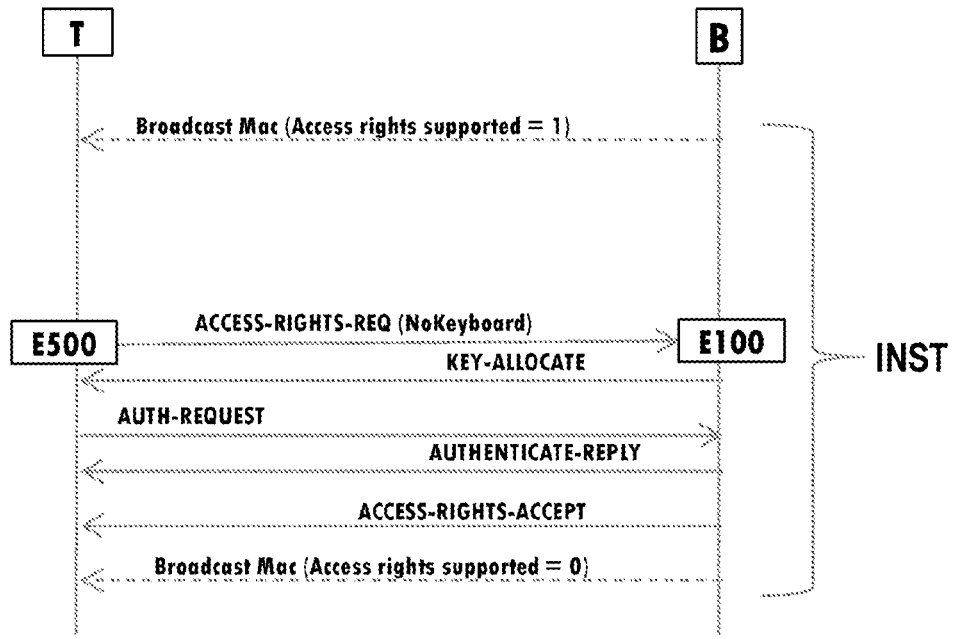
[Fig. 6]
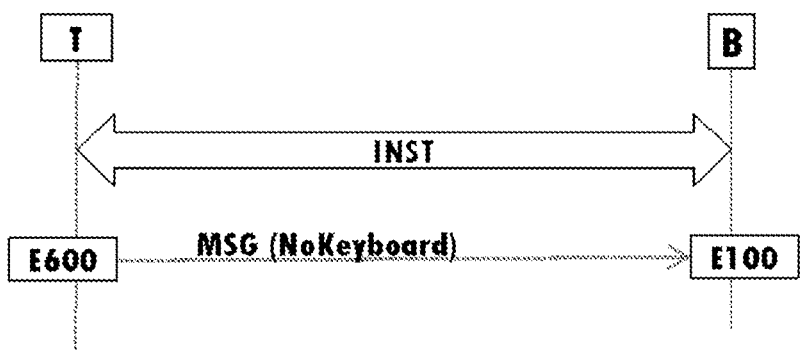
[Fig. 7]
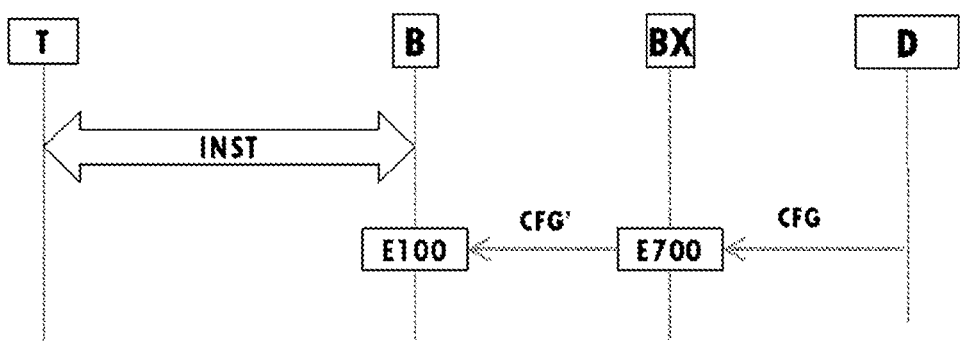

[Fig. 8]
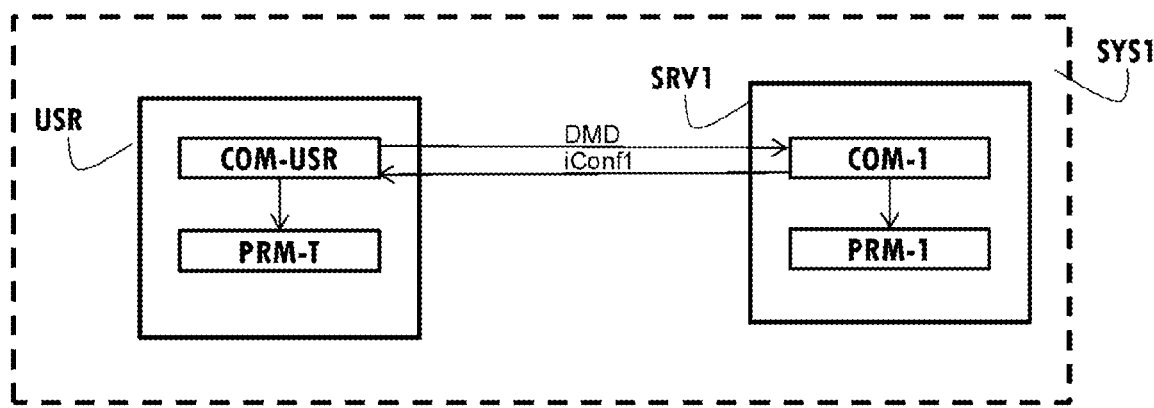
[Fig. 9]
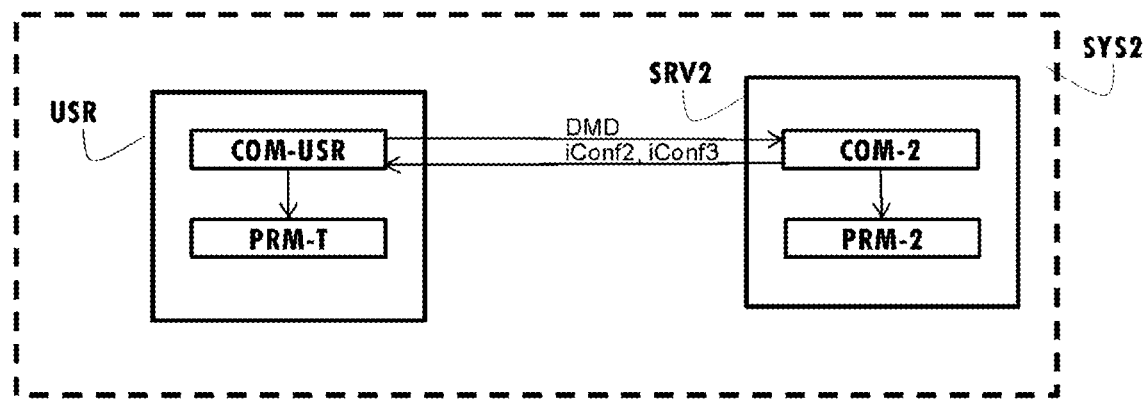

[Fig. 10]
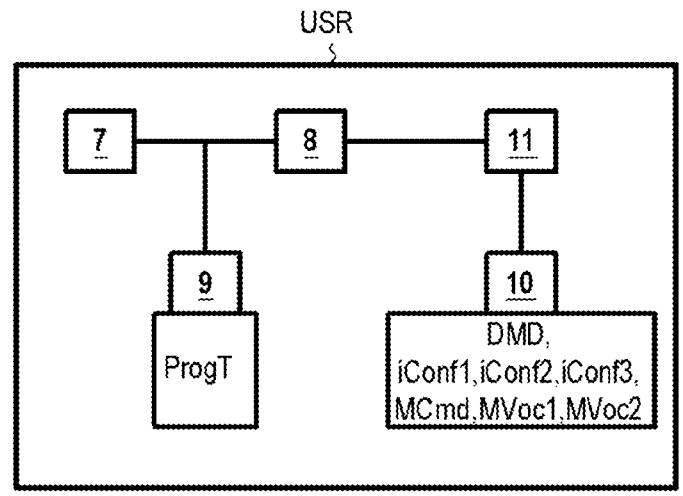
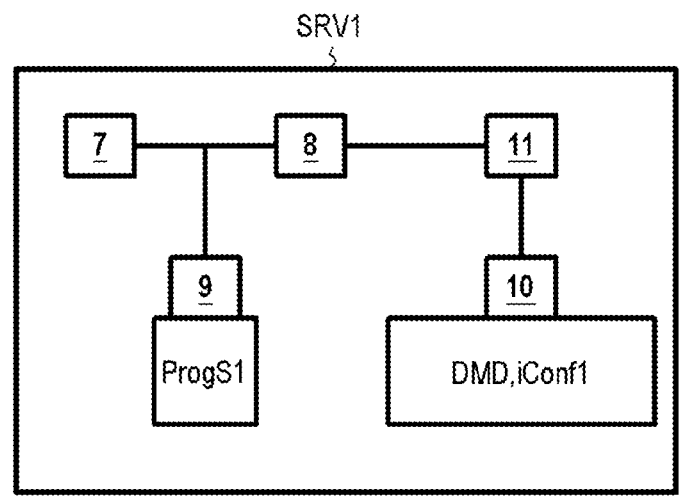
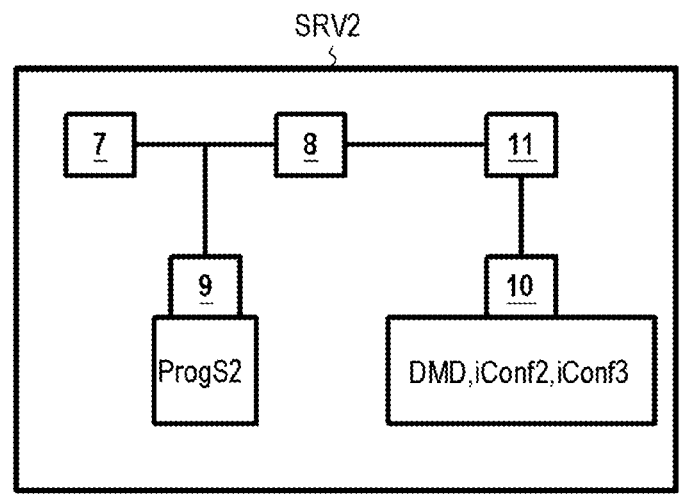

METHOD FOR PROCESSING VOICE MESSAGES, METHOD FOR DEACTIVATING DTMF CODING AND METHOD FOR PROCESSING A REQUEST TO DEACTIVATE DTMF CODING

RELATED APPLICATIONS

This application is the U.S. National Phase of Application No. PCT/FR2019/052964 entitled "METHOD FOR PROCESSING VOICE MESSAGES, METHOD FOR DEACTIVATING DTMF CODING AND METHOD FOR PROCESSING A REQUEST TO DEACTIVATE DTMF CODING" and filed Dec. 9, 2019, which claims the benefit of French Patent Application No. 1874344, filed Dec. 28, 2018, each of which is incorporated by reference in its entirety.

PRIOR ART

The invention relates to the general field of telecommunications. It specifically concerns the field of telecommunications using DTMF (Dual Tone Multi Frequency) encoding used for communications between terminals and interactive voice servers.

DTMF codes are generally issued by a terminal to an interactive voice server, during a communication between the terminal and the server, in order to allow a user of the terminal to select choices proposed by the server and to navigate through a tree offered by the server. However, the server can also issue DTMF codes.

DTMF coding has historically been used for fixed telephone communications over STN (Switched Telephone Network). This encoding constitutes a mode of event signaling (the selections made by the user for example). In the prior art, DTMF encoding is enabled by default, whatever the phone technology used for the communication between the terminal and the voice server.

For STNs, DTMF codes are transported during a telephone call between the terminal and the voice server with the voice data, i.e. in the audio signal using frequencies specific to the DTMF codes, during a time in which the terminal user presses a button used to generate a DTMF code, for example.

For circuit-switched mobile networks, of $2^{nd}$ and $3^{rd}$ generation, (2G, 3G), DTMF codes are issued outside the communication band, in a signaling message. The DTMF codes are transported from the mobile terminal to an MSC (Mobile Switch Center) which inserts these DTMF codes with the voice data, into the audio stream and switches the telephone call to the voice server. However, the DTMF codes issued by the server are received by the terminal with the voice data.

For networks supporting VoIP (Voice over IP), the DTMF codes are transported in IETF RFC4733 mode whenever possible, otherwise with the voice data.

Whatever the circumstances, DTMF encoding is enabled by default in the terminal, the voice server and all the intermediate devices of the network, such as switches, routers, Media Gateway equipment, equipment of I-SBC (Interconnect-Session Border Controller) type, and equipment of NBI (Network Border Infrastructure) type, placed in cut-through configuration between the terminal and the server.

As DTMF encoding is enabled by default, the terminal, the server and the intermediate devices are always listening to the exchanged streams to be able to detect DTMF codes if any exist. Consequently, when a communication takes place without any exchange of DTMF codes, DSP (Digital Signal Processing) resources are wasted.

Another problem arises when the terminal does not possess a keyboard making it possible to generate DTMF codes. In this case, the terminal must use another means to be able to communicate with the voice server deploying DTMF encoding. By way of example, the terminal may use a voice recognition technique making it possible to generate DTMF codes from voice messages, coupled with a technique for synthesizing DTMF codes.

This solution requires a good deal of DSP resources and memory.

In addition, it extends the response time for effectively issuing the DTMF code to the voice server. The user experience is also degraded if the server is configured to end the communication after a determined time and if no DTMF code is received, or if the server is configured to rebroadcast voice announcements awaiting the receipt of a DTMF code.

When the terminal does not possess any local means for voice recognition (and/or for synthesizing DTMF codes), it may employ a specific device which possesses these means. The terminal sends voice messages of the user to the device, and in return receives the DTMF codes to send to the voice server.

This solution moreover has a drawback of increasing the network load for communications between the terminal and the device employed for voice recognition.

In particular, when the terminal can interpret voice commands after detecting a determined voice message, the so-called wake message, the user experience is degraded, since the user must announce the wake message, then a voice message representative of the DTMF code that the user wishes to send to the voice server.

Such a terminal may be a voice assistant compliant with the DECT standard and using a VoIP (Voice over Internet Protocol) telephone service by way of an item of network termination equipment, such as the Djingo assistant from Orange and Deutsche Telekom (registered trademarks), or certain voice assistants designed for the elderly, children or the visually impaired. Specifically, the user must announce the wake voice message so that the terminal interprets the next voice message it detects as a command. By way of example, the wake message of a voice assistant from Google (registered trademark) is "Ok Google!" or "Hello Google!", the wake message of a Djingo assistant is "OK Djingo!" etc. Next, the user must announce vocally what he wishes to send to the voice server which can only interpret DTMF codes, for example by saying "select option 1", the terminal must convert this voice command into a DTMF code if this terminal locally possesses a means of voice recognition and DTMF code synthesis, otherwise the terminal must send the voice command to a specific device which returns the DTMF code to it.

In addition to the drawbacks already mentioned, the user must know the voice command he must announce so that it can be correctly interpreted, for example "option 1" or "1" or "selection 1" or "DTMF 1".

Also, the pronunciation of the wake message during the communication between the terminal and the voice server can disclose private information to this server. For example, the wake message "OK Djingo" discloses that the terminal is a voice assistant of Djingo type and that the user is a customer of the Orange operator.

In addition, voice messages addressed to the voice assistant are received by the server since the communication has been set up. Consequently, when the voice server also possesses a voice recognition module, the voice messages addressed to the voice assistant may trigger unforeseen service interactions at the server, for example the server can generate a "Please repeat, I did not understand the command" message.

There is therefore a need for a solution allowing a terminal to communicate with a voice server, and which does not have these drawbacks.

SUBJECT OF THE INVENTION

The invention relates to a method for processing voice messages by a terminal, the method comprising steps of:
- sending to a voice server a request that must be interpreted by the server to disable DTMF encoding on a communication channel between the server and the terminal;
- receiving from the server an item of configuration data of the terminal;
- interpreting the item of configuration data and applying to the terminal a mode of configuration obtained on the basis of this interpretation; and
- processing voice messages by the terminal according to the mode of configuration.

Correspondingly, the invention relates to a communicating system including a terminal, the communicating system comprising:
- a communicating module configured to send to a voice server a request that must be interpreted by the server to disable DTMF encoding over a communication channel between the server and the terminal, and to receive from the server an item of configuration data of the terminal; and
- a parameterizing module configured to interpret the item of configuration data and to apply to the terminal a mode of configuration obtained on the basis of said interpretation, the terminal having to process voice messages according to the mode of configuration.

The features and advantages of the method for processing voice messages according to the invention described hereinafter apply in the same way to the communicating system according to the invention and vice versa.

The invention makes it possible to adapt communications with voice servers to the terminals of new technologies not necessarily possessing a keyboard to be able to generate DMTF codes.

The invention allows a terminal that cannot or does not wish to use DTMF encoding to attempt to have the DTMF encoding disabled by the server and to set up an alternative solution to DTMF encoding.

In an embodiment, the item of configuration data includes a positive acknowledgment of the request to disable DTMF encoding.

This mode allows the terminal to communicate with the server according to an alternative method to DTMF encoding, this alternative method being able to be specified by the item of configuration data.

For example, the alternative method can be a voice recognition method at server level. The terminal therefore applies a mode of configuration to avoid the generation of DTMF codes and simply transmit the voices messages it detects to the server. The item of configuration data can also include a command to the terminal so that it processes the voice messages before transmitting them to the server, without generating DTMF codes, for example a compression or an application of a filter to the voice messages.

This mode also allows intermediate devices placed in cut-through configuration between the terminal and the server to know that DTMF encoding is disabled on the communication channel between the terminal and the server, and therefore not to monitor this channel any more to detect DTMF codes. The invention therefore makes it possible to reduce the requirement for memory and DSP resources at the intermediate devices concerned by the communication channel between the terminal and the server.

When the terminal is a voice assistant, this mode allows a faster response as regards the messages issued by the terminal, since the latter no longer needs to interpret voice commands or generate, or employ a device to generate, DTMF codes.

In an embodiment, the item of configuration data includes a command for the terminal to interpret for a determined time period the voice messages as voice commands.

This mode allows a terminal of voice assistant type to dispense with the detection of a wake message. The quality of the user experience will then be improved since the user no longer needs to announce the wake message. Additionally, the personal data of the user are better protected: the server does not hear the wake message and thus cannot deduce that the terminal is a voice assistant.

In an embodiment, the request, sent to the voice server, is contained in a field of a signaling message. This embodiment makes it possible to send this request independently of the voice data and transparently with regard to the terminal user.

In an embodiment, the signaling message is:
- a message of SIP INVITE, SIP REINVITE, SIP UPDATE, SIP 200 OK, or SIP 1XX type;
- an offer or a reply in accordance with the SDP (Session Description Protocol);
- a SIP Supported or SIP Required header;
- a new dedicated SIP header for transmitting said request;
- a message compliant with the ISUP/BICC protocol of IAM, ACM, ANM, PRG, or CON type; or
- an HTTP request asking to set up a WebRTC session.

In accordance with the prior art, messages of SIP INVITE, SIP REINVITE and SIP UPDATE type are used for signaling an outgoing communication, messages of SIP 200 OK type are used for signaling an incoming communication, messages of SIP 1XX type are used for signaling without seizure of the line of the callee, in so-called "Early Media" mode, such as a message of SIP 180 Ringing or SIP 183 In Progress type. Messages of SIP 1XX type may encapsulate an offer or a reply compliant with the SDP protocol and suitable for transmitting said request.

Several types of signaling messages can be envisioned. Known messages of the prior art may be used to transmit the request.

In particular, these signaling messages may be used independently of the invention. There is therefore no sending of additional messages specific to the invention.

In another embodiment, the request is contained in a sequence in DTMF.

This embodiment is useful when the communicating system, in accordance with the invention, does not know if the server possesses an alternative means of communication to DTMF encoding. In this case, the communication system sends the request as DTMF code since the DTMF encoding is assumed to be enabled by default at the server.

In another embodiment, the request is contained in a voice message that can be interpreted by said server.

This embodiment allows the user of the terminal to announce vocally that he cannot or does not wish to use DTMF encoding. Alternatively, the voice message containing the request can be generated automatically by the communicating system in accordance with the invention. This embodiment requires the server to possess a means of interpreting the voice message, for example voice recognition means.

In an embodiment, the sending of the request is only done if it has been determined that the terminal does not possess a keyboard making it possible to generate DTMF codes.

This embodiment is particularly beneficial when the communicating system in accordance with the invention, implementing the method of the invention, includes several terminals. The communicating system can request the disabling of DTMF encoding solely for terminals not possessing a keyboard for generating codes in DTMF, the other terminals having keyboards and being able to communicate with the voice server using DTMF encoding.

In an embodiment, the communicating system includes a base station compliant with the DECT standard and the step of determining that the terminal does not possess a keyboard can be implemented by the base station.

In particular, the DECT base station may be integrated into an item of network termination equipment, such an item of equipment known in France by the name of "box" such as a LiveBox (product marketed by Orange, registered trademark). In other words, the base station is not integrated into the item of network termination equipment but it is connected to a digital or analog port of this item of equipment.

In an embodiment, the determination that the terminal does not possess a keyboard is obtained on the basis of a message received from the terminal. This message can be a message of ACCESS-RIGHTS-REQUEST type of pairing of the terminal with the base station, or a message sent after the pairing, such as a message of CC-FACILITY, MM-IWU or CC-INFO type.

Known messages of the prior art may then be used to transmit an item of information indicating that the terminal does not possess a keyboard making it possible to generate DTMF codes. In particular, these messages may be sent independently of the invention, so there is no sending of additional messages specific to the invention.

In an embodiment wherein the database is contained in an item of network termination equipment, the determination that the terminal does not possess a keyboard making it possible to generate DTMF codes is obtained by reading an item of configuration data of this item of equipment.

By configuring the item of network termination equipment, the user can also configure the base station and specify the terminals that do not possess a keyboard.

The invention also relates to a method for disabling DTMF encoding on a communication channel between a voice server and a terminal, the method being implemented by the server and comprising steps of:
  receiving a request that must be interpreted by the server to disable DTMF encoding on the channel;
  enabling for the channel an alternative solution for communicating with the terminal, instead of the DTMF encoding; and
  sending to the terminal an item of configuration data including a positive acknowledgment of the request.

Correspondingly, the invention relates to a first voice server connected to a terminal via a communication channel and which can communicate with said terminal by DTMF encoding, this first server comprising:
  a communicating module configured to receive a request that must be interpreted by said server to disable DTMF encoding on this channel; and
  a parameterizing module configured to enable for the channel an alternative solution for communicating with the terminal, instead of the DTMF encoding, the communicating module being configured to send to the terminal an item of configuration data including a positive acknowledgment of the request.

The features and advantages of the method for processing voice messages by a terminal according to the invention apply in the same way to the method for disabling DTMF encoding according to the invention and vice versa.

The features and advantages of the method for disabling DTMF encoding according to the invention described hereinafter apply in the same way to the first server according to the invention and vice versa.

As explained previously, the invention allows a terminal not wishing or not able to communicate with the server using DTMF encoding (in particular because it does not possess a keyboard), to use the alternative solution proposed by the server. The disabling of DTMF encoding on the channel makes it possible to reduce the transit time and the DSP resource requirement, since the intermediate devices concerned by the channel will no longer need to be in DTMF code detection mode.

In an embodiment, the alternative solution includes a technique of voice recognition when receiving and a voice synthesizing technique when transmitting.

The invention also relates to a method for processing a request to disable DTMF encoding on a communication channel between a voice server and a terminal, this method being implemented by the server and comprising steps of:
  receiving a request that must be interpreted by the server to disable DTMF encoding on the channel;
  maintaining the DTMF encoding;
  sending to the terminal a negative acknowledgement of the request and/or an item of configuration data including a command so that the terminal interprets for a determined time period the voice messages detected by said terminal as voice commands.

Correspondingly, the invention relates to a second voice server connected to a terminal via a communication channel and able to communicate with the terminal by DTMF encoding, this second server comprising:
  a communicating module configured to receive a request that must be interpreted by this server to disable DTMF encoding on this channel; and
  a parameterizing module configured to maintain the DTMF encoding; the communicating module being configured to send to the terminal a negative acknowledgement of the request and/or an item of configuration data including a command so that the terminal interprets for a determined time period the voice messages detected by said terminal as voice commands.

The negative acknowledgment is handled by the terminal as an item of configuration data. In the rest of the description, the expressions "negative acknowledgment" and "item of configuration data containing a negative acknowledgment" are used as equivalents.

The features and advantages of the method for processing voice messages by a terminal according to the invention apply in the same way to the method for processing a request to disable DTMF encoding according to the invention and vice versa.

The features and advantages of the method for processing a request to disable DTMF encoding according to the invention described hereinafter apply in the same way to the second server according to the invention and vice versa.

The second server may not possess an alternative solution to DTMF encoding. When the terminal is a voice assistant, the item of configuration data allows the user of the terminal to dispense with announcing the wake message, and therefore to improve the quality of his experience.

In an embodiment, the sending of the item of configuration data containing the command so that the terminal interprets the voice messages as commands is optional, and the fact for the terminal of receiving the negative acknowledgment is enough for this terminal to interpret the voice messages detected during a determined time period as commands.

The invention also relates to a first communication system including a communicating system in accordance with the invention and a first server in accordance with the invention.

The invention also relates to a second communication system including a communicating system in accordance with the invention and a second server in accordance with the invention.

The invention also relates to a first computer program on a recording medium, this program being able to be implemented in a computer or a device of a communicating system in accordance with the invention, such as the terminal or a DECT base station or an item of network termination equipment. This program includes instructions suitable for implementing a method for processing voice messages by a terminal in accordance with the invention, as described above.

The invention also relates to a second computer program on a recording medium, this program being able to be implemented in a computer or a first server in accordance with the invention. This program includes instructions suitable for implementing a method for disabling DTMF encoding in accordance with the invention, as described above.

The invention also relates to a third computer program on a recording medium, this program being able to be implemented in a computer or a second server in accordance with the invention. This program includes instructions suitable for implementing a method for processing a request to disable DTMF encoding in accordance with the invention, as described above.

Each of these programs can use any programming language, and be in the form of source code, object code, or intermediate code between source code and object code, such as in a partially compiled form, or in any other desirable form.

The invention also relates to an information medium or a recording medium readable by a computer, and including instructions of the first, second or third computer program as mentioned above.

The information media or recording media can be any entity or device capable of storing the programs. For example, the media can include a storage means, such as a ROM, for example a CD-ROM or a microelectronic circuit ROM, or else a magnetic recording means, for example a diskette (floppy disk) or a hard disk, or a flash memory.

In addition, the information or recording media can be transmissible media such as an electrical or optical signal, which can be conveyed via an electrical or optical cable, by radio link, by wireless optical link or by other means.

The programs according to the invention can in particular be downloaded over a network of Internet type.

Alternatively, each information or recording medium can be an integrated circuit into which a program is incorporated, the circuit being able to execute or be used in the execution of one of the methods in accordance with the invention.

BRIEF DESCRIPTION OF THE DRAWINGS

Other features and advantages of the present invention will become apparent from the description given below, with reference to the appended drawings which illustrate an exemplary embodiment thereof devoid of any limitation. In the figures:

FIG. 1 illustrates an architecture of a network including a communicating system and a voice server in accordance with an embodiment of the invention;

FIG. 2 illustrates an architecture of a network including a communicating system and a voice server in accordance with another embodiment of the invention;

FIG. 3 is a flow chart representing steps of a method for processing voice messages, and steps of a method for disabling DTMF encoding according to an embodiment, the methods being in accordance with the invention;

FIG. 4 is a flow chart representing steps of a method for processing voice messages, and steps of a method for processing a request to disable DTMF encoding according to an embodiment, the methods being in accordance with the invention;

FIG. 5 is a flow chart representing a step of determining that a terminal does not possess a keyboard, according to a first embodiment;

FIG. 6 is a flow chart representing a step of determining that a terminal does not possess a keyboard, according to a second embodiment;

FIG. 7 is a flow chart representing a step of determining that a terminal does not possess a keyboard, according to a third embodiment;

FIG. 8 shows functional architectures of a communication system including a communicating system and a first server according to the invention, according to an embodiment of the invention;

FIG. 9 shows functional architectures of a communication system including a communicating system and a second server according to the invention, according to another embodiment of the invention; and FIG. 10 shows hardware architectures of a communicating system, a first and a second voice server according to an embodiment of the invention.

DESCRIPTION OF THE EMBODIMENTS

FIG. 1 illustrates an architecture of a network including a communicating system USR, a first voice server SRV1 and a second voice server SRV2, the system USR and the servers SRV1 and SRV2 all being in accordance with an embodiment of the invention.

The system USR includes a terminal T and a base station B compliant with the DECT standard. The base station B is integrated into an item of network termination equipment BX. This item of equipment BX is used to connect the system USR to a core network WAN.

In this embodiment, the terminal T is a voice assistant, not possessing a keyboard making it possible to generate DTMF codes. This terminal T may interpret voice messages as voice commands, on detection of a wake message MCmd, for example "ok Djingo!". The terminal T does not possess voice recognition means. To interpret voice commands, this terminal T communicates with a dedicated device BCK to implement a voice recognition method for voice assistants, such as the terminal T. The terminal T sends the voice commands it detects to this device BCK and in return receives commands to send DTMF codes corresponding to these commands.

In this embodiment, the server SRV1 includes a DTMF encoder-decoder, and means for applying an alternative solution to DTMF encoding, such as a voice recognition method when receiving and a voice synthesizing method when transmitting.

In the embodiment described here, the server SRV2 does not possess any means for applying an alternative solution to DTMF encoding.

The terminal T and the base station B each possess an integrated circuit (chipset) for communicating as per the DECT standard via a channel compliant with this DECT standard.

The item of equipment BX includes a SIP protocol stack for communicating with devices or servers of the core network WAN. The item of equipment BX can further comprise an integrated circuit and an analog port of FXS type for connecting an analog terminal T2.

FIG. 2 illustrates an architecture of a network including a communicating system USR, a first voice server SRV1 and a second voice server SRV2, the system USR and the servers SRV1 and SRV2 all being in accordance with an embodiment of the invention. This embodiment differs from the embodiment of FIG. 1 in that the base station B is not integrated into the item of network termination equipment BX, but connected to a port of FXS type of the item of equipment BX.

FIG. 3 is a flow chart representing steps of a method for processing voice messages by a terminal, in accordance with the invention, implemented by the communicating system USR, in accordance with the invention, with reference to steps E100, E110, E112, E120, E120', E122 and E132 described hereinafter. The flow chart of FIG. 3 also represents steps of a method for disabling DTMF encoding, in accordance with the invention, implemented by the server SRV1, in accordance with the invention, with reference to steps E114, E116, E118 and E134 described hereinafter.

According to the embodiment described here, the methods of the invention can be implemented in a network, the architecture of which is illustrated by FIG. 1 or by FIG. 2.

We assume here that the terminal T is already paired with the base station B.

During a step E100, the base station B determines that the terminal T does not possess any keyboard used to generate DTMF codes. This step E100 will be described in detail subsequently with reference to FIGS. 5 to 7.

During a step E102, the terminal T detects the wake message MCmd. It then configures itself to interpret the next voice message detected as a voice command.

During a step E104, the terminal receives a voice message MVoc1 and considers it as a voice command. The terminal T solicits the device BCK to ask it to interpret the voice command. During step E104, the terminal T sends the voice message MVoc1 to the device BCK, in a message of "HTTP Put" type for example.

During a step E106 this device BCK receives the voice message, interprets that this messages includes a command to make a call to the server SRV1, and sends back in return to the terminal T a command to call the server SRV1. This command is sent in a message of "HTTP 200 Ok" type for example, with a parameter of "XMS: call" type.

During a step E108, the terminal receives this command and initiates an outgoing communication to the server SRV1.

In accordance with the prior art, the terminal sends a message of "CC-Setup" type to the base station B to send the outgoing communication. The base station B acknowledges this message by a message of "CC-Call-Processing" type.

During a step E110, the base B sends to the SIP protocol layer of the item of equipment BX a message of CLL type, after inserting a request DMD that must be interpreted by the server SRV1 to disable DTMF encoding on the communication channel between the server SRV1 and the terminal T. In this example, the request DMD includes an item of information indicating that the terminal T does not possess any keyboard.

During a step E112, the SIP protocol layer of the item of equipment BX issues a signaling message, of "SIP INVITE" type, including the request DMD, to the server SRV1.

During a step E114, the server SRV1 receives this signaling message and extracts the request DMD.

During a step E116, the server SRV1 enables the voice recognition solution for the terminal T, instead of DTMF encoding.

During a step E118, the server SRV1 sends a signaling message of "SIP 200 OK" type including an item of configuration data i-Conf1 in this message. This signaling message makes is used to inform the terminal T that the server SRV1 agrees to receive the communication issued by the terminal T, but also, owing to the item of data i-Conf1, to positively acknowledge the request to disable DTMF encoding on the channel connecting the server SRV1 to the terminal T.

The SIP protocol layer of the item of equipment BX receives this signaling message during a step E120 and transmits it to the base station B, which in turn sends to the terminal T a message of CC-Connect type, after inserting the item of configuration data i-Conf1 into this message.

The terminal T receives the item of configuration data i-Conf1, during a step E120', interprets during a step E122 the item of configuration data i-Conf1 as a command to disable DTMF encoding, and applies during step E122 a mode of configuration wherein it disables DTMF encoding.

Meanwhile, further to the receipt of the message of SIP 200 OK type, the item of equipment BX sends during a step E124 an acknowledgment to the server SRV1. On receipt E126 of this acknowledgment, the server SRV1 disables DTMF encoding for the terminal T.

After steps E122 and E126 of disabling DTMF encoding by the terminal T and the server SRV1, a communication channel is set up between them without DTMF encoding, but based on the alternative solution proposed by the server SRV1. Devices of the network WAN in cut-through switching between the terminal T and the server SRV1 will know by reading the messages of SIP 200 OK type (E118, E120) and/or its acknowledgment (E124, E126), that this channel does not use DTMF encoding and then disable listening on this channel of DTMF encoding.

During a step E128, the server SRV1 sends the terminal T a data stream, to offer it several options for navigation through a service hierarchy, for example this data stream includes a voice message: "say 1 or salesperson to be put through to a salesperson, say 2 or technical to be put through to technical support".

In accordance with the prior art, this data stream is transferred from the server SRV1 via the network WAN to the SIP stack of the item of equipment BX, then from the latter, via the base station B, to the terminal T. The terminal T receives this data stream during a step E130.

During a step E132, the terminal T detects a voice message MVoc2 of the user, for example "1" or "salesperson". In accordance with the mode applied during step E122, the terminal T sends this voice message MVoc2 to the server SRV1 in the standard way in the telephone stream.

The server SRV1 receives the voice message MVoc2 during a step E134, interprets it via its voice recognition solution and deduces that it is a selection of the first option.

During a step E136, the server SRV1 sends a second data stream to the terminal T, taking into account the interpretation of the message MVoc2. This second stream can be a voice message pulling down a menu of "for a new order, say 1 or new; for an order in progress, say 2 or in progress, for a complaint, say 3 or complaint . . . " type.

FIG. 4 is a flow chart representing the steps of a method for processing voice messages by a terminal, in accordance with the invention, implemented by the communicating system USR, in accordance with the invention, with reference to steps E100, E110, E112, E120, E120', E222, E234, E236 and E238 described hereinafter. The flowchart of FIG. 4 also represents the steps of a method for processing a request to disable DTMF encoding, in accordance with the invention, implemented by the server SRV2, in accordance with the invention, with reference to steps E114, E216, E218 and E232 described hereinafter.

According to the mode described here, the method of the invention may be implemented in a network, the architecture of which is illustrated by FIG. 1 or by FIG. 2.

It is assumed here that the terminal T is already paired with the base station B.

In the mode described here, the methods include E100 to E114 implemented by the communicating system USR, the device BCK and the server SRV2, similar to steps E100 to E114 described with reference to FIG. 3, implemented by the system USR, the device BCK and the server SRV1.

Further to receiving E114 the request DMD, the server SRV2 not possessing any alternative solution to the DTMF encoding maintains the DTMF encoding during a step E216.

During a step E218, the server SRV2 sends a signaling message of "SIP 200 OK" type while inserting an item of configuration data i-Conf2 into this message. This signaling message is used to inform the terminal T that the server SRV2 agrees to receive the communication issued by the terminal T, but also to transmit the item of data i-Conf2. This item of data i-Conf2 includes a negative acknowledgment of the request DMD to disable DTMF encoding on the channel connecting the server SRV2 to the terminal T.

During steps E120 and E120', similar to steps E120 and E120' described with reference to FIG. 3, the SIP protocol layer of the item of equipment BX receives this signaling message and the terminal T receives the item of configuration data i-Conf2.

During a step E222, the terminal T interprets the item of configuration data i-Conf2, and applies a mode of configuration in which it maintains DTMF encoding enabled.

Meanwhile, further to receiving the message of SIP 200 OK type, the item of equipment BX sends during a step E124 an acknowledgment to the server SRV2. On receiving E226 this acknowledgment, a communication channel is set up between the terminal T and the server SRV2. This channel uses DTMF encoding.

During a step E128, similar to step E128 described with reference to FIG. 3, the server SRV2 sends to the terminal T a data stream, to offer it several options of navigation through a hierarchy of its service, for example this data stream includes a voice message: "type 1 to be put through to a salesperson, type 2 to be put through to technical support".

The terminal T receives this data stream during a step E130.

During a step E232, the server SRV2 sends to the terminal T a message M including an item of configuration data iConf3. This item of data iConf3 includes a command so that the terminal T interprets for a determined time period the voice messages detected by this terminal T as voice commands.

The terminal T receives the message M and extracts the item of configuration data iConf3 on the basis of this message during a step E234.

During a step E236, the terminal T interprets the item of data iConf3 and applies a mode of configuration to interpret the next detected voice messages, for the determined time period, as voice commands. The terminal T will no longer need to detect the wake message MCmd to enter this mode of interpretation of voice commands.

During a step E238, the terminal T detects a voice message MVoc2 "1". In accordance with the mode applied during step E236, the terminal T interprets the voice message MVoc2 as a voice command and sends it to the specific device BCK in a message of HTTP Put type. In a particular embodiment, the terminal T vocally prefixes the voice message MVoc2 transmitted to the device BCK with a voice message "DTMF" such that the device BCK receives a voice message "DTMF 1" although the user of the terminal T has only pronounced "1".

In a similar way to step E106, the device BCK interprets during a step E240 the voice command MVoc2 and sends in return to the terminal T, in a message of HTTP 200 OK type, a command so that the terminal T generates a DTMF code "1".

The terminal T receives this command during a step E242 and sends to the server SRV2 the DTMF code "1" during a step E244.

During a step E246, the stack SIP of the item of equipment BX inserts this DTMF code into a message of RTP RFC4733 type before transmitting it to the server SRV2.

The server SRV2 receives this voice message and extracts the DTMF code during a step E248 and deduces that it is a selection of the first option, the sales service.

It is assumed that the time period specified by the item of configuration data iConf3 expires during a step E250. During this step E250, the terminal T applies its default mode of configuration, to interpret voice messages as commands only on detection of the wake message MCmd.

FIG. 5 illustrates an exemplary implementation of the step E100 of determining by the base station B that the terminal T does not possess a keyboard for generating DTMF codes, according to an embodiment of the invention.

In this example, the step E100 is implemented during the pairing of the terminal T to the base station B. This mode can be implemented in a network, the architecture of which corresponds to that illustrated by FIG. 1 or by FIG. 2.

During a step E500, the terminal T requests from the base station access rights, by sending to it a message of ACCESS-RIGHTS-REQ type, compliant with the DECT standard, except that in accordance with the present invention, this message is modified to insert an item of information "NoKeyboard" indicating that the terminal T does not possess a keyboard.

The base station B receives this item of information during step E100. This step E100, included in the pairing phase, is followed by exchanges of pairing messages in accordance with the DECT standard.

FIG. 6 illustrates an exemplary implementation of step E100 of determining by the base station B that the terminal T does not possess a keyboard making it possible to generate DTMF codes, according to another embodiment of the invention.

In the embodiment described here, the terminal T is already paired to the base station B. This mode may be implemented in a network, the architecture of which corresponds to that illustrated by FIG. 1 or by FIG. 2.

The terminal T sends during a step E600 a message MSG of CC-FACILITY type, known from the DECT standard, but modifying it by an insertion, in an "Escape to Proprietary" field of this message, an item of information "NoKeyboard" indicating that the terminal T does not possess a keyboard.

The base station B receives this message MSG during step E100.

Alternatively, during step E600, the terminal T sends to the base station B a message MSG of MM-IWU type, inserting the item of information "NoKeyboard" into an "Escape to Proprietary" field or into a "IWU-IWU" field of this message MSG.

Alternatively, during a signaling of an incoming communication, and during step E600, the terminal T sends to the base station B a message MSG of CC-Info type, inserting the item of information "NoKeyboard" into an "Escape to Proprietary" field of this message. This message MSG of CC-Info type can be sent by the terminal T after a receipt of a CC-Setup message and before or after the sending of a CC-Alerting message, for example.

Alternatively, during a signaling of an outgoing communication, and during step E600, the terminal T sends to the base station B a message MSG of CC-Info type, inserting the item of information "NoKeyboard" into an "Escape to Proprietary" field of this message. This message MSG of CC-Info type can be sent by the terminal T after receipt of a CC-Call Proceeding message, for example.

FIG. 7 illustrates an exemplary implementation of the step E100 of determining by the base station B that the terminal T does not possess a keyboard making it possible to generate DTMF codes, according to another embodiment of the invention.

In the mode described here, the terminal T is already paired to the base station B. This mode can implemented in a network, the architecture of which corresponds to that illustrated by FIG. 1 wherein the base station B is contained in an item of network termination equipment BX.

During a step E700 the item of equipment BX receives items of configuration data CFG of a configuring device D.

Given that the base station B is part of the item of equipment BX, the data CFG also include configuration data CFG' concerning the base station B.

By way of example, a user of the terminal T can select via the device D a configuration parameter indicating that his terminal T does not possess a keyboard. The device D can also be a network server for configuring the item of equipment BX.

In particular, even if the terminal T possesses a keyboard, a user who wishes to disable DTMF encoding to improve his experience and avoid the announcement of the wake message MCmd can insert an item of false information indicating that his terminal T does not possess a keyboard.

The item of equipment BX extracts from its own configuration data CFG, the data CFG' concerning the base station and sends them to the base station B. During a step E100, the base station B receives its configuration data CFG'.

By reading the data CFG', the base station B determines that the terminal T does not possess a keyboard.

Other embodiments:

In another embodiment, the terminal T possesses its own SIP protocol stack, the communicating system USR in accordance with the invention includes only this terminal T and the steps previously described implemented by the base station B or by the SIP stack of the item of equipment BX are implemented by the terminal T.

In an embodiment, the request DMD is contained in a signaling message of SIP INVITE, SIP REINVITE, SIP UPDATE, SIP 200 OK, or SIP 1XX type, or in an offer or a request in accordance with the SDP protocol, or in a SIP Supported or SIP Required header or in a new SIP header dedicated to transmit said request DMD.

In an embodiment, the request DMD is contained in a message in accordance with the ISUP/BICC protocol of IAM, ACM, ANM, PRG, or CON type.

In an embodiment, the request DMD is contained in a request HTTP to set up a WebRTC session.

In an embodiment, the terminal T sends to the server SRV1 or to the server SRV2 a sequence in DTMF containing the request DMD.

In an embodiment, the terminal T sends to the server SRV1 a voice message including the request DMD, this server SRV1 possessing voice recognition means for interpreting the voice message.

In an embodiment, when the terminal T receives (E120') from the server SRV2 the item of configuration data iConf2 including the negative acknowledgment of the request DMD, this terminal T interprets the voice messages it detects during a determined time period as voice commands. In this mode, the sending (E232) by the server SRV2 of the item of configuration data iConf3 is optional.

FIG. 8 represents functional architectures, according to an embodiment of the invention, of a communication system SYS1, the communicating system USR including the terminal T and the voice server SRV1, all in accordance with the invention.

FIG. 9 represents functional architectures, according to an embodiment of the invention, of a communication system SYS2, the communicating system USR including the terminal T and the voice server SRV2, all in accordance with the invention.

The system SYS1 includes the communicating system USR and the server SRV1.

The system SYS2 includes the communicating system USR and the server SRV2.

The communicating system USR in accordance with the invention includes at least the terminal T. In the modes described with reference to FIGS. 3 and 4, the communicating system USR further comprises the base station B and the item of equipment BX.

The communicating system USR includes:
 a communicating module COM-USR configured to send to the voice server SRV1 (or SRV2) the request DMD that must be interpreted by this server to disable DTMF encoding on a communication channel between this server SRV1 (or SRV2) and the terminal T, and to receive from this server SRV1 (or SRV2) the item of configuration data, iConf1, (or iConf2 and/or iConf3) of the terminal T; and
 a parameterizing module PRM-T configured to interpret the item of configuration data iConf1, (or iConf2 and/or iConf3) and to apply to the terminal T a mode of configuration obtained on the basis of the interpretation, since the terminal T must process voice messages according to this mode of configuration.

The voice server SRV1 includes:
 a communicating module COM-1 configured to receive the request DMD that must be interpreted by the server to disable DTMF encoding on the channel connecting this server SRV1 to the terminal T; and a parameterizing module PRM-1 configured to enable for said channel an alternative solution to communicate with the terminal T, instead of said DTMF encoding, the communicating module COM-1 being configured to send to the terminal T the item of configuration data iConf1 including a positive acknowledgment of the request DMD.

The voice server SRV2 is connected to the terminal T via a communication channel and able to communicate with the terminal T by DTMF encoding. The server SRV2 comprises:

a communicating module COM-2 configured to receive the request DMD that must be interpreted by the server SRV2 to disable DTMF encoding on said channel and a parameterizing module PRM-2 configured to maintain DTMF encoding, the communicating module COM-2 being configured to send to the terminal T the item of configuration data iConf2 including a negative acknowledgment of the request DMD and the item of configuration data iConf3 including a command so that the terminal T interprets during a determined time period the voice messages detected by this terminal as voice commands.

In the embodiment described here, the communicating system USR, the server SRV1 and the server SRV2 each have the hardware architecture of a computer, as illustrated in FIG. 10.

Each of the architectures of the communicating system USR and the servers SRV1 and SRV2 particularly comprises a processor 7, a random-access memory 8, a read-only memory 9, a non-volatile flash memory 10 in a particular embodiment of the invention and communicating means 11. Such means are known per se and will not be described in further detail here.

The read-only memory 9 of the system USR according to the invention constitutes a recording medium in accordance with the invention, readable by the processor 7 and on which is here recorded a computer program ProgT in accordance with the invention.

The read-only memory 9 of the server SRV1 according to the invention constitutes a recording medium in accordance with the invention, readable by the processor 7 and on which is here recorded a computer program ProgS1 in accordance with the invention.

The read-only memory 9 of the server SRV2 according to the invention constitutes a recording medium in accordance with the invention, readable by the processor 7 and on which is here recorded a computer program ProgS2 in accordance with the invention.

The memory 10 of the communicating system USR is used to record variables used for executing the steps of the method for processing vocal messages according to the invention, such as the request DMD, the configuration data iConf1, iConf2 and iConf3, the wake message MCmd and the detected voice messages MVoc1 and MVoc2.

The memory 10 of the server SRV1 is used to record variables used for executing the steps of the method for disabling DTMF encoding on a channel according to the invention, such as the request DMD and the item of configuration data iConf1.

The memory 10 of the server SRV2 is used to record variables used for executing the steps of the method for processing a request to disable DTMF encoding on a channel according to the invention, such as the request DMD and the configuration data iConf2 and iConf3.

The computer program ProgT here defines functional and software modules, configured to process voice messages by the terminal T. These functional modules are based on and/or control the hardware elements 7-11 of the system USR mentioned previously.

The computer program ProgS1 here defines functional and software modules, configured to disable DTMF encoding by the server SRV1. These functional modules are based on and/or control the hardware elements 7-11 of the server SRV1 mentioned previously.

The computer program ProgS2 here defines functional and software modules, configured to process by the server SRV2 a request to disable DTMF encoding. These functional modules are based on and/or control the hardware elements 7-11 of the server SRV2 mentioned previously.

The invention claimed is:

1. A method for processing voice messages by a terminal, said method comprising:
    sending to a voice server a request that must be interpreted by the server to disable DTMF encoding on a communication channel between the server and the terminal;
    receiving from the voice server, in response to said request, an item of configuration data of the terminal;
    interpreting the item of configuration data and applying to the terminal a mode of configuration for processing voice messages, wherein the mode of configuration is obtained on the basis of the interpretation; and
    processing voice messages by said terminal according to said mode of configuration, voice messages of a user of the terminal.

2. The method of claim 1 wherein the request is contained in a field of a signaling message.

3. The method of claim 2 wherein the signaling message is:
    a message of SIP INVITE, SIP REINVITE, SIP UPDATE, SIP 200 OK, or SIP 1XX type;
    an SDP offer or reply;
    a SIP Supported or SIP Required header;
    a new dedicated SIP header for transmitting the request;
    a message compliant with the ISUP/BICC protocol of IAM, ACM, ANM, PRG, or CON type; or
    an HTTP request asking to set up a WebRTC session.

4. The method of claim 1 wherein the request is contained in a sequence in DTMF or in a voice message that can be interpreted by the server.

5. The method of claim 1 wherein the sending of the request is only done if it has been determined that the terminal does not possess a keyboard making it possible to generate DTMF codes.

6. The method of claim 5 wherein it is determined (E100) that the terminal does not possess a keyboard:
    on the basis of a message received from the terminal, the message being able to be a message of pairing of said terminal with another device, or a message of CC-FACILITY, MM-IWU or CC-INFO type; or
    by reading an item of configuration data of a device with which the terminal is paired.

7. The method of claim 1 wherein the item of configuration data includes:
    a positive acknowledgment of the request to disable DTMF encoding; or
    a command so that the terminal interprets for a determined time period the voice messages as voice commands.

8. A non-transitory computer readable data medium having stored thereon instructions which, when executed by a processor, cause the processor to perform the method of claim 1.

9. A method for disabling DTMF encoding on a communication channel between a voice server and a terminal, the method being implemented by the voice server and comprising:
- receiving a request that must be interpreted by a request server to disable DTMF encoding on the channel;
- enabling for the channel an alternative solution for communicating with the terminal, instead of the DTMF encoding; and
- sending to the terminal, in response to said request, an item of configuration data including a positive acknowledgment of the request.

10. The disabling method of claim 9 wherein the alternative solution includes a voice recognition technique when receiving and a voice synthesizing mode when transmitting.

11. A non-transitory computer readable data medium having stored thereon instructions which, when executed by a processor, cause the processor to perform the method of claim 9.

12. A method for processing a request to disable DTMF encoding on a communication channel between a voice server and a terminal, the method being implemented by the server and comprising:
- receiving a request that must be interpreted by the server to disable DTMF encoding on the channel;
- maintaining DTMF encoding;
- sending to the terminal, in response to said request, a negative acknowledgement of said request and/or an item of configuration data including a command so that the terminal interprets for a determined time period the voice messages detected by the terminal as voice commands.

13. A non-transitory computer readable data medium having stored thereon instructions which, when executed by a processor, cause the processor to perform the method of claim 12.

14. A communicating system including a terminal, said communicating system comprising:
- communicating means configured to send to a voice server a request that must be interpreted by the voice server to disable DTMF encoding over a communication channel between the voice server and the terminal, and to receive from the voice server, in response to said request, an item of configuration data of the terminal; and
- a parametizer configured to interpret the item of configuration data and to apply to the terminal a mode of configuration for processing voice messages, wherein the mode of configuration is obtained on the basis of the interpretation, the terminal having to process voice messages of a user of the terminal according to the mode of configuration.

15. The communicating system of claim 14 further including an item of network termination equipment to which said terminal is paired.

16. A communication system including the communicating system of claim 14 and a voice server connected to a terminal via a communication channel and able to communicate with the terminal by DTMF encoding, the voice server comprising:
- communicating means configured to receive a request that must be interpreted by the voice server to disable DTMF encoding on the channel; and
- a parametizer configured to maintain the DTMF encoding,
- the communicating means being configured to send to the terminal, in response to said request, a negative acknowledgement of the request and/or an item of configuration data including a command so that the terminal interprets for a determined time period the voice messages detected by the terminal as voice commands.

17. A communication system including the communicating system of claim 14 and a voice server connected to a terminal via a communication channel and which can communicate with the terminal by DTMF encoding, the voice server comprising:
- communicating means configured to receive a request that must be interpreted by the voice server to disable DTMF encoding on the channel; and
- a parametizer configured to enable for the channel an alternative solution for communicating with the terminal, instead of the DTMF encoding,
- the communicating means being configured to send to the terminal, in response to said request, an item of configuration data including a positive acknowledgment of the request.

18. A voice server connected to a terminal via a communication channel and which can communicate with the terminal by DTMF encoding, the voice server comprising:
- communicating means configured to receive a request that must be interpreted by said voice server to disable DTMF encoding on said channel; and
- parametizer configured to enable for the channel an alternative solution for communicating with the terminal, instead of the DTMF encoding,
- the communicating means being configured to send to the terminal, in response to said request, an item of configuration data including a positive acknowledgment of the request.

19. A voice server connected to a terminal via a communication channel and able to communicate with the terminal by DTMF encoding, the voice server comprising:
- communicating means configured to receive a request that must be interpreted by the voice server to disable DTMF encoding on the channel; and
- a parametizer configured to maintain the DTMF encoding,
- the communicating means being configured to send to the terminal, in response to said request, a negative acknowledgement of the request and/or an item of configuration data including a command so that the terminal interprets for a determined time period the voice messages detected by the terminal as voice commands.

* * * * *